United States Patent [19]

Hennenfent et al.

[11] Patent Number: 4,517,041
[45] Date of Patent: May 14, 1985

[54] METHOD FOR ATTACHING A WORKPIECE TO A WORKPIECE CARRIER

[75] Inventors: Douglas J. Hennenfent, New Hope; Allan L. Holmstrand, Bloomington; Alan G. Kracke, Minnetonka, all of Minn.

[73] Assignee: Magnetic Peripherals Inc., Minneapolis, Minn.

[21] Appl. No.: 600,266

[22] Filed: Jun. 27, 1984

Related U.S. Application Data

[62] Division of Ser. No. 430,195, Sep. 30, 1982, Pat. No. 4,457,114.

[51] Int. Cl.$^3$ .............................................. B32B 31/24
[52] U.S. Cl. ................................ 156/155; 156/331.2; 156/344; 51/324
[58] Field of Search ............ 51/216 R, 324; 219/200, 219/201; 100/93 P; 29/446, 559; 156/155, 344, 331.2

[56] References Cited

U.S. PATENT DOCUMENTS

| | | | |
|---|---|---|---|
| 2,039,398 | 5/1936 | Dye | 29/446 |
| 3,571,911 | 3/1971 | Littwin | 29/559 |
| 4,071,944 | 2/1978 | Chuss et al. | 156/155 |
| 4,300,965 | 11/1981 | Schmidt et al. | 156/155 |
| 4,388,132 | 6/1983 | Hoge et al. | 156/295 |

Primary Examiner—Frederick R. Schmidt
Assistant Examiner—Judy J. Hartman
Attorney, Agent, or Firm—Edward L. Schwarz; Joseph A. Genovese

[57] ABSTRACT

A workpiece carrier includes a flat support surface to which a workpiece is attached by bonding. The carrier includes means for bending the carrier support surface so that it becomes concave. When dealing with a relatively flexible workpiece, one can cause the workpiece's surface to be machined to attain a convex shape by bending the support surface of the carrier concavely, and then bonding the workpiece attachment surface to the carrier while the carrier support surface is concavely bent. Allowing the carrier's support surface to assume a less concave shape then imparts a convex shape to the surface of the workpiece to be machined.

5 Claims, 8 Drawing Figures

METHOD FOR ATTACHING A WORKPIECE TO A WORKPIECE CARRIER

This is a division of application Ser. No. 06/430,195, filed Sept. 30, 1982, now U.S. Pat. No. 4,457,114, issued July 3, 1984.

BACKGROUND OF THE INVENTION

In certain machining operations where the cutting is performed by grit or teeth carried on a surface of highly precise flatness, it is desirable to regulate the final profile of the machined surface, so as to locate all of a series of features carried on a surface intersecting the one machined to within a preselected tolerance band from the machined surface. In one such typical operation, 13 features are located on 0.16 in. centers and ideally the surface must be machined so that each feature is finally located from 20 to 80 uin. from the surface. It is desirable to produce this final configuration regardless of the spacing of these features from either the original surface to be lapped or otherwise machined or from another datum line.

The typical operation mentioned above arises in the batch fabrication of thin film magnetic heads for disk memories. The features comprise individual thin film head throats deposited on the workpiece's side and so located, relative to the original position of the surface to be machined, as to require substantial machining of the surface. After the machining process is complete, the bar is sliced transversely to free the individual transducer heads.

These heads can not be deposited precisely along any datum line due to errors in the mask controlling the deposition, errors in position of the mask, and changes in bar geometry caused by external force and residual stress. Nonetheless, all of the head throats must be located within the predetermined 20-80 uin. tolerance band from the edge in order for them to be acceptable. Obviously, the fewer reject heads resulting from a given workpiece, the more efficient and economical the operation is. Heretofore it has not been possible to locate high percentages of the features simultaneously within the specified tolerance band at any stage of the machining process.

It is also possible to place sensors at predetermined positions on the bar to be machined, to determine the progress of the machining operation. In fact, the sensors which we are using provide a continuous and highly accurate indication (to 5 uin. or better) of the spacing of the surface being machined from each feature. Therefore, it is possible to monitor during the machining process the progress of each of the features toward the preselected tolerance band.

PRIOR ART STATEMENT

The best art of which we are aware is the *IBM Technical Disclosure Bulletin* (TDB). Vol. 24, No. 1A, p. 198, June 1981, which discloses for use in lapping thin film heads, a workpiece support which provides "automated compensation for bow errors". *IBM TDB*, Vol. 23, No. 4, September 1980; Vol. 13, No. 4, September 1970 and U.S. Pat. No. 3,821,815 disclose art pertaining to the lapping or machining steps in batch fabricating thin film transducer heads.

BRIEF DESCRIPTION OF THE INVENTION

Our invention is a workpiece carrier tool useful for increasing the percentage of features which fall within the tolerance band. To accomplish this, we propose to bend the workpiece during machining so that all or at least most of the transducers fall within a tolerance band of the desired width. The way we accomplish this is by bonding the workpiece to the carrier tool. In our preferred embodiment, the carrier includes a support bar supported at its center in spaced apart relationship from a relatively rigid base by a stem, so that each end of the support bar is cantilevered in effect, from the stem. A pair of columns supported by the base on opposite side of the stem extend toward and contact load points on the ends of the support bar. These columns have positive thermal coefficients of expansion.

The support bar and the workpiece bonded to it can be bent by applying heat to each column, causing the column to expand and apply force to the support bar. We prefer to apply the heat with a resistance element through which current can be passed in an axial bore within each column. As much as 400 uin. adjustment may be needed in the relative position of the features carried on the workpiece in the previously mentioned typical operation. For a typical metal which has a coefficient of thermal expansion of around $10^{-5}$ in./in./°F., one can see that the necessary bending of the support bar can be accomplished with a temperature rise of only a few tens of degrees Fahrenheit, if each column is an inch or so long, has a sufficiently large solid area cross section, and the support bar is not excessively stiff.

By monitoring the distance between each transducer and the tolerance band, one can easily determine the bending of the support bar necessary to accomplish the goal of increasing the amount of machining which occurs at those transducer stations whose features are still relatively far from the tolerance range.

Accordingly, one feature of this invention is to provide a means for supporting a workpiece during machining operations.

Another purpose is to provide a means for bending the workpiece while mounted on the support.

Still another purpose is to control such bending so as to allow a series of partially aligned features on the workpiece to all enter a preselected tolerance band before any have moved out of said tolerance band during the machining operation.

Another purpose is to reduce the scrap rate for the articles being simultaneously produced by the machining of the workpiece.

DETAILED DESCRIPTION OF THE PREFERRED EMBODIMENT

Figure 1:
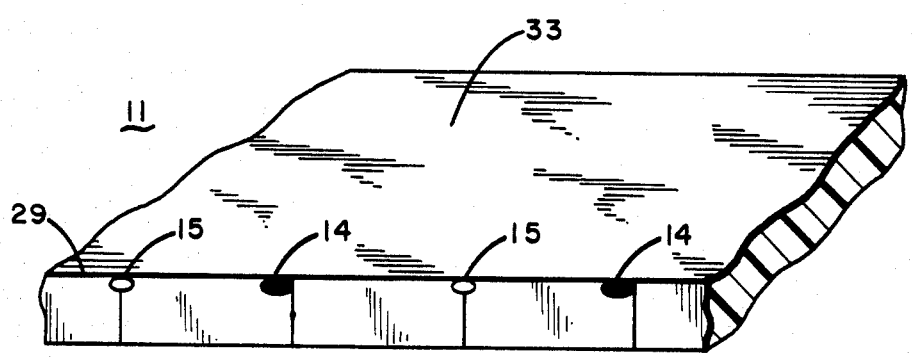
FIG. 1 is a preferred workpiece to be supported by this carrier tool.
Figure 5A:
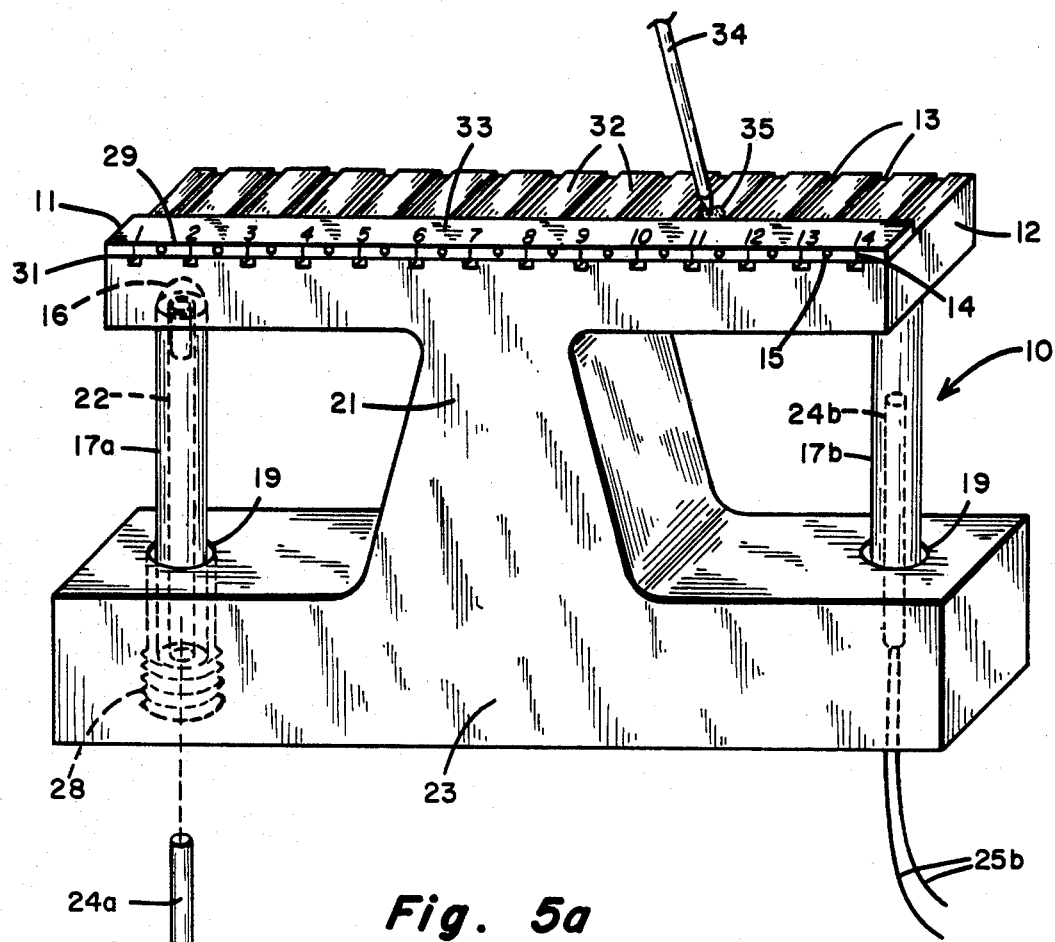
FIG. 5a shows a preferred embodiment of the invention, with the workpiece mounted on it.
Figure 5B:
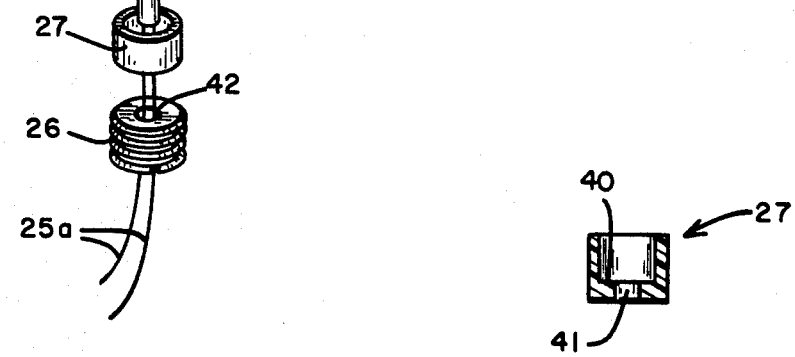
FIG. 5b is a cross section view of the insulating spacers 27 separating columns 17a and 17b from set screws 26.

The section of a typical workpiece 11 shown in FIG. 1 has an arrangement of symbolically displayed features 15 which may be the throats of thin film magnetic transducers for use in disk memories between which are located so-called machining guides or sensors 14. As a practical matter, since it is essential for the successful operation of the invention that features 15 and the sensors 14 immediately adjacent them be precisely spaced respective each other relative to line 29, reference to a feature 15 and a sensor 14 adjacent it are equivalent. That is, when a sensor 14 is known to have a certain spacing from line 29 with very little error, one then knows the spacing between an adjacent feature 15 and line 29 with very nearly the same accuracy. Forming such an accurate positional relationship between features 15 and sensors 14 can be done according to the teachings of copending U.S. Pat. No. 4,457,114, entitled *Method for Calibrating a Machining Sensor*, having Holmstrand, Hennefent and Kracke as coinventors, and having a common assignee with this application. In the typical operation discussed supra, workpiece 11 has 14 machining sensors 14, which are numbered from left to right, 1 through 14 as shown in FIG. 5.

In the typical operation, the face 33 of workpiece 11 is slowly lapped by a lapping wheel causing edge 29 to shift slowly toward and through sensors 14. Although the critical feature, throat height, of each transducer 15 is quite accurately placed on workpiece 11 relative to adjacent sensors 14, the relatively great length of workpiece 11 and the manufacturing tolerances involved means it is not possible that every sensor 14 or feature 15 will be located at identical spacings from either the initial position of line 29 or intermediate positions as line 29 is shifted towards guides 14 and transducers 15 during the machining operation.

Figure 2:
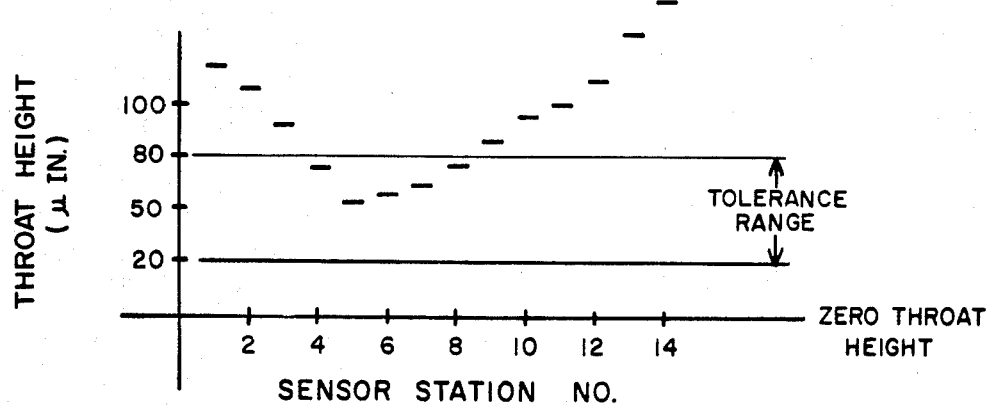
FIG. 2 is a graph showing the distances of individual features carried on a side of the workpiece, from an edge of the workpiece being shifted by the machining operation.
Figure 3:
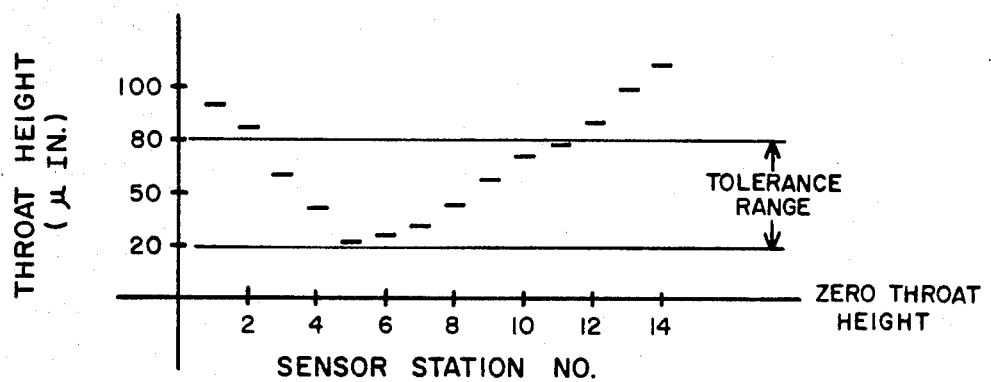
FIG. 3 is a graph showing the same distances as in FIG. 2, shifted by the machining of approximately 30 uin. from the workpiece edge.
Figure 4:
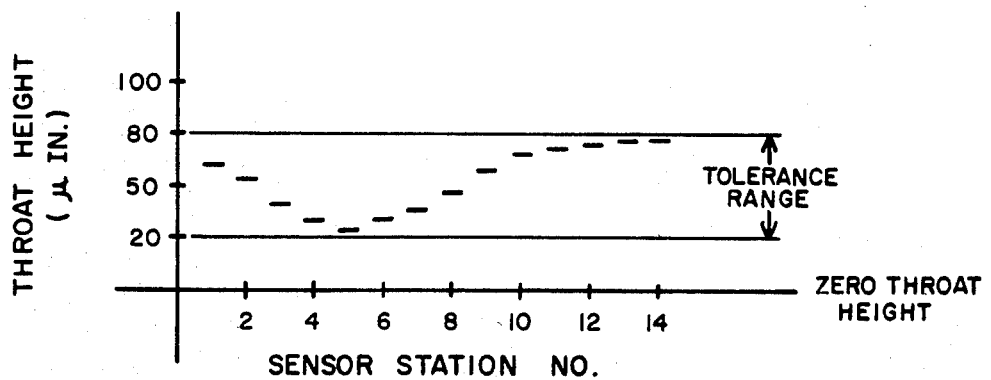
FIG. 4 is a graph showing the results of using this carrier to bend during the machining operation a workpiece with the graphic characteristics of FIG. 2 and thereby change the relative positions of the features from the machined edge.

To more clearly illustrate this situation, the graphs of FIGS. 2–4 show the distances of individual sensors 14 (or features 15) from line 29 on a greatly expanded scale for various situations in the typical machining operation. In each of FIGS. 2–4, the small dashes indicate on the ordinate scale the spacing of the sensor 14 (or feature 15 adjacent it) whose position number appears on the abcissa, from edge 29. For the typical application here, there is a head throat height tolerance range for the transducers of from 20 to 80 uin. corresponding to the two horizontal lines at these points in FIGS. 2–4.

Thus, in FIG. 2 edge 29 has due to the initial machining approached the various sensors 14 from a typical initial spacing of several hundred microinches. At this stage for the particular workpiece 11 involved, sensors 14 having position numbers 4–8 have fallen within the tolerance range and sensors 14 having positions 1–3 and 9–14 have not yet moved within the tolerance range. In FIG. 3, about 30 uin. more has been ground from face 33, and the same sensors have been positioned nearer to edge 29, so that sensor 14 at position 5 is nearly at the low end of the tolerance range and sensors at positions 12–14 are still above the maximum tolerance level of 80 uin. spacing from edge 29.

It can be seen that sensors 14 located at positions 4–8 will fall below the tolerance range if machining continues until sensors 14 at positions 1, 2 and 12–14 fall within the tolerance range. Therefore, the most favorable point to stop machining is that shown in FIG. 3 since 9 out of the 14 sensors involved will have the proper tolerance relative to edge 29, and therefore the largest number of acceptable transducers 15 will be produced. It is also clear, that if some means of causing more machining to occur in the vicinity of sensors 14 numbered 1, 2 and 12–14 was available, that all of the transducers 15 carried on workpiece 11 could be made useable.

The workpiece carrier 10 shown in FIG. 5 is one means of providing this capability. A relatively rigid base 23 has integral with it at its midpoint one end of a stem portion 21 which projects perpendicularly from base 23. Support bar 12 is fixed approximately midway along its length to, and preferably is integral with, the other end of stem 21, and extends approximately parallel to base 23. Each end of bar 12 is thus cantilevered from stem 21 and is held in opposing, spaced apart relationship to base 23. Workpiece 11 is bonded by adhesive in adhesive line 31 to faces 32. Columns 17a and 17b are positioned in bores 19. Bores 19 pass entirely through base 23, and are located so that their axes intersect load point areas near each end of support bar 12. A portion of each bore 19 adjacent the end further from bar 12 is threaded so as to mesh with a set screw 26. Each set screw 26 has an internal concentric bore.

When bar 12, stem 21 and base 23 are chosen from a thermally conductive and thermally expanding material, it is necessary to thermally insulate columns 17a and 17b so as to prevent heat transfer to the remainder of the carrier 10. Accordingly, an end plug 16 made of some low heat conductivity material is mounted at the end of each column 17a and 17b adjacent their load point areas. The plugs 16 preferably have a dome-shaped head and a shaft projecting from it which fits snugly into a bore 22 of the column 17a and 17b to keep plugs 16 precisely interposed between the load point area and the adjacent column 17a or 17b. A cylindrical spacer 27 with an inside diameter slightly greater than the outside diameter of columns 17a and 17b fits within each bore 19 atop the set screw 26 engaging the threads in bore 19. An inner shoulder 40 (FIG. 5b) partially closes the ends of the spacers 19 adjacent set screws 26, thereby spacing the end of column 17b from its adjacent set screw 26. Spacers 27 can be made from the same material that plugs 16 are made. The material for these plugs 16 and caps 27 must have substantial mechanical compressive strength.

Each column 17a and 17b as mentioned above, has a bore 22 extending along substantially all its length, and which communicates with the bore of the adjacent set screw 26 through the end of spacer 27. Heater elements 24a and 24b are located respectively within the bores 22 of columns 17a and 17b, and have respectively a pair of wires 25a and 25b for conducting electric current to the associated element 24a and 24b. Elements 24a and 24b are in intimate thermal contact with columns 17a and 17b respectively. Wires 25a and 25b pass through the bores of set screws 26, and thus are available to be connected to a convenient power source. The bores 42 and 41 respectively in set screws 26 and (FIG. 5b) spacers 27 are preferably large enough to allow a heater element 24a and 24b to be inserted into or withdrawn from column 17a or 17b respectively.

Workpiece 11 is attached preferably by gluing to the support face 32. Grooves 13 permit cutting the workpiece into individual transducer assemblies after face 33 of workpiece 11 has been machined to the proper position relative the sensors 14. The entire carrier can be mounted by clamping it on a tool arm for support relative to the machine cutter or abrasive-covered disc.

There are several considerations which are necessary so that this article will function properly. It is necessary that bar 12 be relatively flexible in comparison to base 23. This is accomplished in our design simply by making the thickness (vertical height in FIG. 5a) relatively smaller for support bar 12 than for base 23.

Columns 17a and 17b must be selected from materials which have a substantial positive thermal coefficient of linear expansion and which also have a relatively high modulus of elasticity. Ferrous alloys (particularly stainless steel), certain aluminum alloys, and brass all have relatively high thermal expansion coefficients, on the order of 6–10 uin./in.°F. It is also useful that columns 17a and 17b have relatively high thermal conductivities so that the heat from elements 24a and 24b is rapidly distributed through the entire masses of columns 17a and 17b. We prefer stainless steel for columns 17a and 17b. A column 17a or 17b which is one inch long and made of stainless steel will expand approximately 10 uin. for each °F. increase it experiences. A 10° F. temperature change in columns 17a or 17b thus causes a 100 uin. expansion of such a column when its ends are not restrained. So as to introduce no errors caused by differing rates of thermal expansion, we prefer that bar 12, stem 21, and base 23 all be made from the material constituting columns 17a and 17b. It appears that bending can be controlled to within a few microinches.

In operation, electric current is applied to one or both of the pairs of conductors 25a and 25b, causing the heater element 24 connected thereto to produce heat, warming the column 17a or 17b enclosing it. This warmth causes the previously explained expansion of the column involved, producing force against the arm of support bar 12 at the associated load point. This force causes support bar 12 to elastically bend, giving workpiece 11 a slightly concave shape. The amount of bend is dependent on the cross sectional area and the elastic modulus of columns 17a and 17b and the stiffness of bar 12 and base 23, in accordance with well-known principles of structural analysis. Therefore, one must determine the amount of deflection needed in bar 12, and then design columns 17a and 17b and bar 12 to provide enough force for the temperature range achievable to cause the deflection needed. Control of current flow through heating elements 24 permits regulation of the temperature of columns 17a and 17b with reasonable accuracy, and thereby control of the deflection of support bar 12. Referring to FIGS. 3 and 4, one can see that bending workpiece 11 concavely by about 40 uin. will cause the ends to be machined more than the center, and sensors 14 at stations 1, 2 and 12–14 to be brought within the tolerance range after more machining.

It is necessary that set screws 26 be tightened sufficiently to give preload to columns 17a and 17b. The amount of preload depends on the previously mentioned mechanical characteristics, and can be accurately set by proper torquing of set screws 26 once the configuration of arm 12, columns 17a and 17b, and base 23 has been finally selected.

Figure 6A:
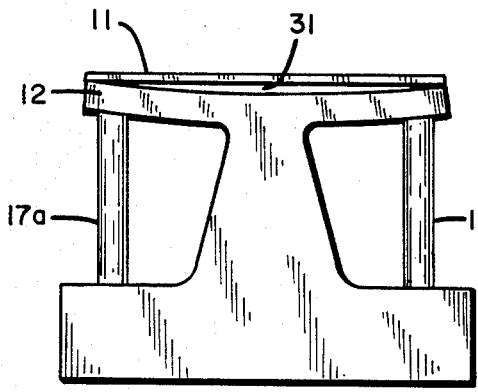
FIGS. 6a and 6b show in exaggerated form two appearances of the workpiece carrier during a preferred method of attaching the workpiece to it.
Figure 6B:
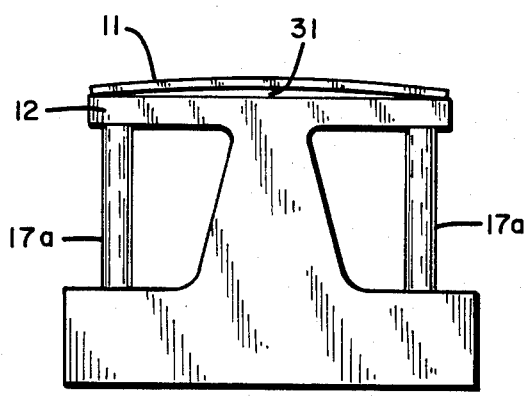

It may also be desirable to provide an initial slight convex prebend to workpiece 11 prior to any bending of support bar 12. This is preferably accomplished by heating columns 17a and 17b before workpiece 11 is bonded to bar 12. Workpiece 11 is then bonded in place as shown in FIG. 6a. When columns 17a and 17b are then cooled, they contract and bar 12 returns to its undistorted shape as shown in FIG. 6b. Workpiece 11 is constrained by the adhesive to take the bend caused by bar 12's straightening.

To insure accuracy and repeatability of the bonding of workpiece 11 to bar 12, workpiece 11 must initially have little residual stress in it while the bonding occurs. Accordingly, we have developed a preferred method for accomplishing the bonding. This method involves first laying workpiece 11 directly on upwardly facing faces 32. Then a hypodermic needle 34 or other applicator is used to place drops 35 of a liquid adhesive having low viscosity and surface tension at regular intervals on faces 32 adjacent a side of workpiece 11. This adhesive must be of the type which hardens shortly after contact by air, and which can be dissolved in some manner when one desires to detach a workpiece 11 from support 10. Capillary action draws the adhesive into the cracks between faces 32 and workpiece 11. The adhesive then bonds workpiece 11 to faces 32 when it hardens forming adhesive lines 31. Workpiece 11 is detached by soaking the entire assembly in an appropriate solvent. The adhesive material which we currently favor is the cyano-acrylate known as Superbonder 916 temporary bonding adhesive, which is manufactured by Loctite Corp., Newington, CT 06111. This material has a viscosity of 1–5 centipoise at 25° C. and a suitable surface tension. The cured adhesive is dissolved by nitromethane or acetone. The surface tension and viscosity values must be respectively large and small enough to cause the adhesive to be drawn into the gap between the faces 32 and the workpiece 11 by capillary action. By using this non-pressure technique to bond the workpiece 11 to bar 12, little or no initial stress is present in the workpiece 11. Furthermore, the use of this technique avoids the necessity of accurate machining of the surface of workpiece 11 bonded to faces 32. Irregularities in the gap are simply filled with adhesive. When applying the adhesive, it is desirable that the ends of workpiece 11 are bonded to face 32 first. Once the ends have been fixed, then we prefer to alternately proceed from face 32 to face 32 inwardly with the bonding.

Turning now to miscellaneous variations of this invention, it is possible to supply the heat to columns 17a and 17b by means other than electrical heating elements 24 and 24b but no other method appears to be as efficient or easily controlled as is electricity.

Another variation possible is to cantilever bar 12 at one end from stem 21 and employ only a single column 17a. Thus only one end of bar 12 is bent when current is applied to heat column 17a. At this time, this design does not appear to be as desirable as the preferred embodiment described above, because it is not possible to bend the two ends of bar 11 different amounts.

Again, if bar 12, stem 21, and base 23 are made from a refractory or other material which has low thermal conductivity or a small coefficient of thermal expansion, then it would not be necessary to thermally insulate columns 17a and 17b from base 23 or bar 12.

What is claimed is:

1. In a method for mounting on a workpiece carrier a relatively thin, elongate workpiece having an elongate, flat surface, said workpiece carrier having a support surface which may be elastically bent into a more concave shape responsive to power input to the workpiece carrier, an improvement for creating a convex bend in the workpiece, including the steps of (a) supporting the carrier with the support surface facing upwardly; then (b) supplying power at a predetermined rate to the workpiece carrier, thereby causing said support surface to assume a predetermined more concave shape;

(c) laying the workpiece, flat surface down, on the support surface; then (d) bonding the workpiece along its flat surface to the support surface; and then (e) reducing the rate of power supplied to the workpiece carrier, whereby the support surface elastically returns to a less concave shape.

2. The method of claim 1, wherein the workpiece bonding step further comprises placing drops of a liquid adhesive having low viscosity and surface tension and hardening shortly after exposure to air in contact with the support surface and a side of the workpiece.

3. The method of claim 2, wherein the liquid adhesive comprises cyano-acrylate.

4. The method of claim 3 further comprising the step of detaching the workpiece from the workpiece carrier by soaking the workpiece and workpiece carrier in a cyano-acrylate solvent.

5. The method of claim 2, further comprising the step of detaching the workpiece from the workpiece carrier by soaking the workpiece and workpiece carrier in a solvent of the adhesive.

* * * * *